United States Patent
Tsutsumi

(10) Patent No.: US 11,518,268 B2
(45) Date of Patent: Dec. 6, 2022

(54) CONTROL SYSTEM, CONTROL METHOD, AND STORAGE MEDIUM

(71) Applicant: HONDA MOTOR CO., LTD., Tokyo (JP)

(72) Inventor: Daisuke Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 16/907,396

(22) Filed: Jun. 22, 2020

(65) Prior Publication Data

US 2021/0009004 A1    Jan. 14, 2021

(30) Foreign Application Priority Data

Jun. 24, 2019 (JP) ............... JP2019-116337

(51) Int. Cl.
*B60L 58/12* (2019.01)
*B60L 53/62* (2019.01)
*B60L 55/00* (2019.01)

(52) U.S. Cl.
CPC ............... *B60L 58/12* (2019.02); *B60L 53/62* (2019.02); *B60L 55/00* (2019.02)

(58) Field of Classification Search
CPC ..................................................... B60L 58/12
USPC ......................................................... 320/104
See application file for complete search history.

(56) References Cited

U.S. PATENT DOCUMENTS

2011/0202217 A1 * 8/2011 Kempton ............. B60L 53/305
320/109

2018/0186246 A1   7/2018 Kudo et al.
2019/0280514 A1 * 9/2019 Ramirez Lluvias .........
H01R 13/6675

FOREIGN PATENT DOCUMENTS

WO    2017/009978    1/2017
WO    2017/158706    9/2017

OTHER PUBLICATIONS

Japanese Notice of Allowance for Japanese Patent Application No. 2019-116337 dated Jan. 26, 2021.

* cited by examiner

*Primary Examiner* — Edward Tso
*Assistant Examiner* — Ahmed H Omar
(74) *Attorney, Agent, or Firm* — Amin, Turocy & Watson, LLP

(57) ABSTRACT

A control system is a control system that controls transfer of electric power between a power grid and a secondary battery that is mounted in a vehicle and stores electric power for travel and includes a determiner configured to determine whether a state in which charging electric power or discharging electric power is equal to or less than a threshold continues for a predetermined time on the basis of a detection result of the charging electric power with which the secondary battery is charged or the discharging electric power discharged from the secondary battery, and a controller configured to cause the transfer of electric power between the power grid and the secondary battery to stop when the determiner determines that the state in which the charging electric power or the discharging electric power is equal to or less than the threshold continues for the predetermined time.

12 Claims, 6 Drawing Sheets

CONTROL SYSTEM, CONTROL METHOD, AND STORAGE MEDIUM

CROSS-REFERENCE TO RELATED APPLICATION

Priority is claimed on Japanese Patent Application No. 2019-116337, filed Jun. 24, 2019, the content of which is incorporated herein by reference.

BACKGROUND

Field

The present invention relates to a control system, a control method, and a storage medium.

Description of Related Art

In recent years, electric vehicles have become more common. An electric vehicle is equipped with a traveling battery (for example, a secondary battery), and travels by electricity being stored in the traveling battery and electric power being supplied from the traveling battery to a motor at the time of travel. For this reason, a user of the electric vehicle stores electricity in the traveling battery of the electric vehicle, for example, at a charging station provided at a specific location, at home, and the like.

A social system called vehicle to grid (V2G) or vehicle to home (V2H) has been proposed. In V2G, electric power is exchanged between a power grid including a commercial electric power network and an electric vehicle. In V2H, electric power is exchanged between a home and an electric vehicle. In V2G and V2H, when an electric vehicle is not used as a transportation means, the traveling battery mounted in the electric vehicle is used as an electric power storage facility in the commercial power network or the home.

For this reason, bidirectional electric power transfer is performed between the power grid and the electric vehicle participating in V2G or V2H (PCT International Publication No. WO 2017/009978).

SUMMARY

Here, when the traveling battery of an electric vehicle participating in V2G or V2H is used as an electric power storage facility, detailed charging and discharging is repeated according to fluctuations in the commercial electric power network or a home, which may cause deterioration to progress in some cases. However, it has been difficult in a conventional technology to curb the deterioration of the traveling battery of an electric vehicle that participates in V2G or V2H.

The present invention has been made in view of such circumstances, and an object thereof is to provide a control system, a control method, and a storage medium capable of curbing a deterioration of the traveling battery.

The control system, the control method, and the storage medium according to the present invention have adopted the following configuration.

(1) A control system according to one aspect of the present invention is a control system that controls transfer of electric power between a power grid and a secondary battery that is mounted in a vehicle and stores electric power for travel, and includes a determiner configured to determine whether a state in which charging electric power or discharging electric power is equal to or less than a threshold continues for a predetermined time on the basis of a detection result of the charging electric power with which the secondary battery is charged or the discharging electric power discharged from the secondary battery, and a controller configured to cause the transfer of electric power between the power grid and the secondary battery to stop when the determiner determines that the state in which the charging electric power or the discharging electric power is equal to or less than the threshold continues for the predetermined time.

(2) In the control system according to the aspect of (1) described above, the determiner and the controller are connected to the vehicle by a cable, and are embedded in a charging device that mediates the transfer of electric power between the power grid and the secondary battery.

(3) In the control system according to the aspect of (1) described above, the determiner and the controller are mounted in the vehicle and are embedded in a control device that controls charging and discharging of electric power of the secondary battery.

(4) In the control system according to the aspect of any one of (1) to (3) described above, the controller stops the transfer of electric power between the power grid and the secondary battery when the determiner determines that the detection result of the charging state of the secondary battery at a timing at which the transfer of electric power is stopped has reached the upper limit value of the charging state or the lower limit value of the charging state and even when a request for charging and discharging of the secondary battery is received from an external device.

(5) In the control system according to the aspect of any one of (1) to (4) described above, when it is indicated that a detection result of the charging state of the secondary battery at the timing at which the transfer of electric power is stopped has reached a upper limit value of the charging state, the controller stops the transfer of electric power between the power grid and the secondary battery for a predetermined time or until the detection result falls below a lower limit value of the charging state.

(6): A control method of another aspect of the present invention includes, by a computer that controls transfer of electric power between a power grid and a secondary battery that is mounted in a vehicle and stores electric power for travel, determining whether a state in which charging electric power or discharging electric power is equal to or less than a threshold continues for a predetermined time on the basis of a detection result of the charging electric power with which the secondary battery is charged or the discharging electric power discharged from the secondary battery, and causing the transfer of electric power between the power grid and the secondary battery to stop when the state in which the charging electric power or the discharging electric power is equal to or less than the threshold continues for the predetermined time.

(7) A non-transitory computer-readable storage medium that stores a computer program to be executed by a computer that controls transfer of electric power between a power grid and a secondary battery that is mounted in a vehicle and stores electric power for travel, to perform at least: determining whether a state in which charging electric power or discharging electric power is equal to or less than a threshold continues for a predetermined time on the basis of a detection result of the charging electric power with which the secondary battery is charged or the discharging electric power discharged from the secondary battery, and causing the transfer of electric power between the power grid and the secondary battery to stop when it is indicated that the state in which the charging electric power or the discharging electric power is equal to or less than the threshold continues for the predetermined time.

According to (1) to (7), it is possible to curb the deterioration of the traveling battery.

DESCRIPTION OF EMBODIMENTS

Hereinafter, embodiments of a control system, a control method, and a storage medium of the present invention will be described with reference to the drawings.

[Outline of V2X System]

Figure 1:
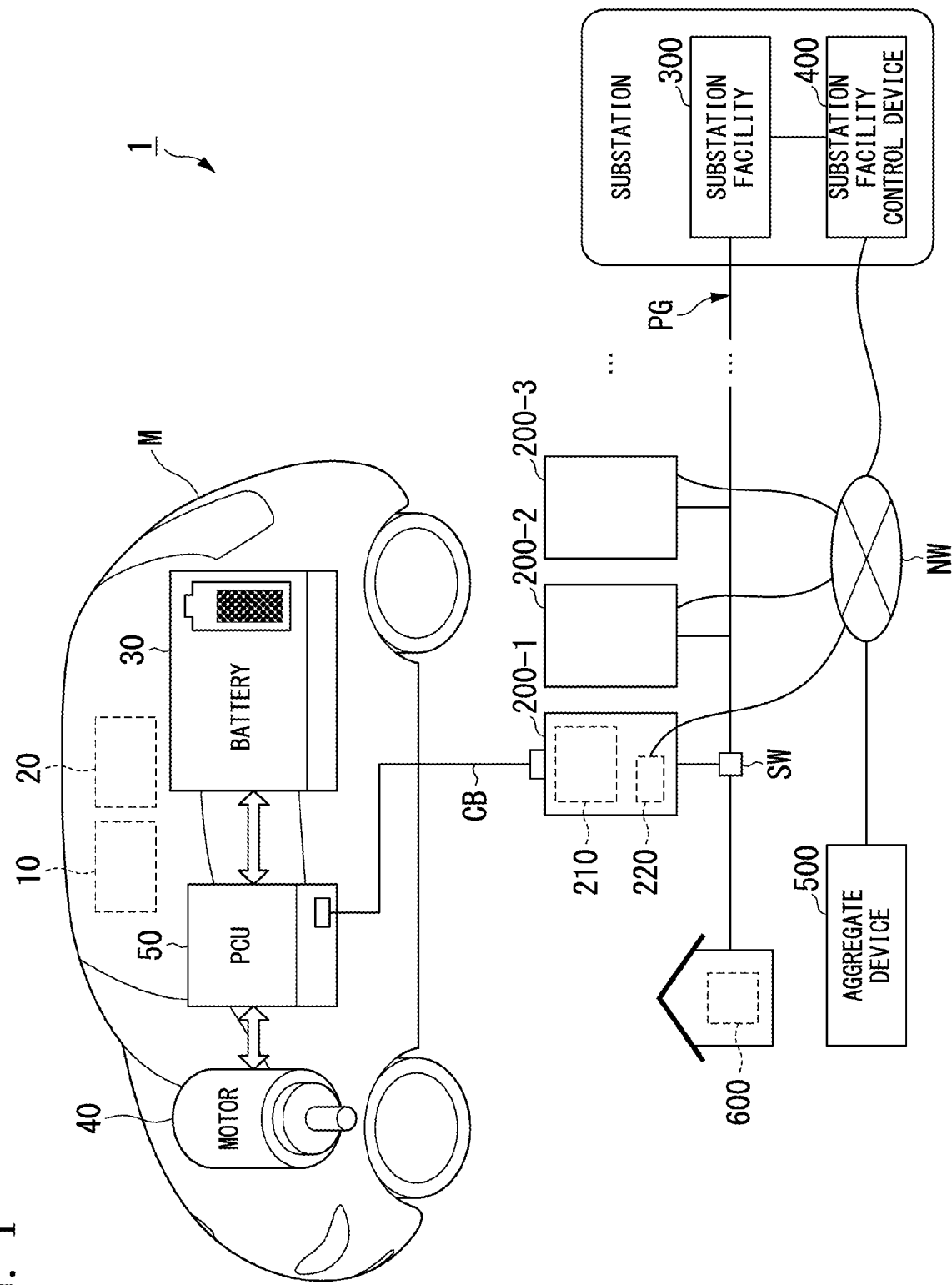
FIG. 1 is a diagram which shows an outline of a V2X system using a control system of the present embodiment.

First, an outline of a vehicle to grid (V2G) system and a vehicle to home (V2H) system will be described. FIG. 1 is a diagram which shows an outline of a V2X system 1 using a control system of the present embodiment. The V2G system is a system that connects electric power of a traveling battery mounted on an electric vehicle to a power grid and allows the electric power to be exchanged between the vehicle and the power grid. The V2H system is a system that connects the electric power of a traveling battery installed in an electric vehicle to an indoor power distribution system to allow electric power to be exchanged between the vehicle and a house. In the following description, the V2G system and the V2H system are referred to as a V2X system when there is no distinction between them.

The V2X system 1 shown in FIG. 1 includes one or more vehicles M including an information processing device 10, one or more external power supply devices 200 (external power supply devices 200-1, 200-2, 200-3, ..., and so forth to be shown), a substation facility 300, a substation facility control device 400, an aggregate device 500, and one or more power conditioners 600. The information processing device 10, the external power supply device 200, the substation facility control device 400, the aggregate device 500, and the power conditioner 600 can communicate with each other via a network NW. The network NW includes, for example, a cellular network, a Wi-Fi network, the Internet, a wide area network (WAN), a local area network (LAN), a public line, a provider device, a dedicated line, a wireless base station, and the like. These components may directly perform wireless communication without going through the network NW.

The vehicle M includes, for example, the information processing device 10, a vehicle control device 20, a traveling battery 30, a motor 40, and a power controller (PCU) 50. The vehicle M is, for example, a vehicle that is driven by the motor 40 using electric power supplied by the traveling battery 30 mounted in the vehicle and travels by applying a drive force of the motor 40 to drive wheels. The vehicle M is, for example, a traveling electric vehicle or a so-called hybrid vehicle that includes an engine and an electric motor.

The information processing device 10 controls charging and discharging of electric power of the traveling battery 30 on the basis of an instruction from an external power supply device 200 or the aggregate device 500 to be described below. Details of a configuration of the information processing device 10 will be described below.

The motor 40 is, for example, a three-phase alternate current electric motor. The PCU 50 converts a direct current voltage supplied from the traveling battery 30 into an alternate current voltage on the basis of control of the vehicle control device 20, and supplies the alternate current voltage to the motor 40. On the basis of the control of the vehicle control device 20, the PCU 50 converts the direct current voltage supplied from the external power supply device 200 into a direct current voltage of a level with which the traveling battery 30 can be charged, and charges the traveling battery 30 with the direct current voltage. The PCU 50 converts a direct current voltage discharged from the traveling battery 30 into a direct current voltage of a level that can be input to the external power supply device 200 and supplies the direct current voltage to the external power supply device 200.

The vehicle M may be an autonomous vehicle. In this case, the vehicle control device 20, for example, automatically controls one or both of steering and acceleration or deceleration of the vehicle on the basis of a surrounding environment of the vehicle M recognized on the basis of a detection result of each detection functional unit (not shown) included in the vehicle M to execute a driving control.

The external power supply device 200 is connected to a power grid PG including a commercial electric power grid. As the external power supply device 200 and the PCU 50 of the vehicle M are connected via a cable CB when the vehicle M is stopped, transfer of electric power can be mediated. The external power supply device 200 includes a controller 210 and a communicator 220. On the basis of an instruction received from the aggregate device 500 by the communicator 220, the controller 210 charges the traveling battery 30 of the vehicle M with electric power supplied by the power grid PG or supplies electric power discharged from the traveling battery 30 to the power grid PG. In the following description, it is assumed that an external power supply device 200-1 of the external power supply device 200 is provided in a house of an owner of the vehicle M. In the following description, it is assumed that the information processing device 10 and the external power supply device 200-1 communicate with each other via a communication line included in the cable CB without going through the network NW. Details of a configuration of the external power supply device 200 will be described below.

The substation facility 300 is installed in a substation (including a substation for power distribution), transforms (for example, steps down) a voltage of electric power generated at a power generation station or electric power supplied from another substation, and supplies the transformed voltage to the power grid PG (power distribution). The substation facility control device 400 derives an amount of electric power to be supplied to the power grid PG on the basis of various types of information and controls the substation facility 300 such that the derived amount of electric power is supplied to the power grid PG. The various types of information are, for example, weather information, climate information, a calendar, and the like.

The aggregate device 500 determines, for example, an action required for the vehicle M participating in V2G on the basis of information on a supply status of electric power in the power grid PG, received from the substation facility control device 400, and information on charging and discharging for the power grid PG, received from the vehicle M participating in V2G.

For example, when electric power is surplus in the power grid PG, the aggregate device 500 requires the vehicle M to consume (absorb) electric power by charging the traveling battery 30 with the surplus electric power, or, when electric power is insufficient in the power grid PG, the aggregate device 500 requires the vehicle M to supply electric power to another device by discharging the insufficient electric power from the traveling battery 30.

Specifically, the aggregate device 500 instructs the vehicle control device 20 of the vehicle M and occupants of the vehicle M to move to the external power supply device 200 connected to a power distribution system in which the electric power is surplus. When the designated external power supply device 200 and the designated vehicle M are connected by the cable CB, the aggregate device 500 instructs the designated external power supply device 200 to charge the traveling battery 30 of the vehicle M with the surplus electric power in the power grid PG. The aggregate device 500 instructs the vehicle control device 20 of the vehicle M and the occupants of the vehicle M to move to the external power supply device 200 connected to a power distribution system in which electric power is insufficient. When the designated external power supply device 200 and the designated vehicle M are connected by the cable CB, the aggregate device 500 instructs the designated external power supply device 200 to discharge the insufficient electric power in the power grid PG from the traveling battery 30 of the vehicle M.

The power conditioner 600 is installed in a house and converts electric power supplied from the traveling battery 30 into electric power (for example, a commercial power supply) suitable for an indoor power distribution system of the house. The power conditioner 600 controls a switch SW provided at a connection point between the external power supply device 200-1, the power grid PG, and the power conditioner 600. Specifically, the power conditioner 600 controls the switch SW such that any one of the external power supply device 200-1 and the power grid PG is connected to the power conditioner 600. In the following description, when there is no distinction between the indoor power distribution system of a house and the power grid including a commercial electric power network, they are described as the power grid PG.

Here, while the traveling battery 30 of the vehicle M participating in the V2X system 1 and the external power supply device 200-1 are connected by the cable CB, fine charging and discharging (charging and discharging of short time) may be repeated depending on fluctuations of electric power such as an excess or a deficiency of electric power in the power grid PG, and thus the deterioration of the traveling battery 30 may progress in some cases. In this case, there is a possibility that the vehicle M may travel a shorter distance or for a shorter travel time according to the electric power stored in the traveling battery 30. Therefore, it is preferable that the traveling battery 30 of the vehicle M participating in the V2X system 1 be charged and discharged to curb the deterioration. The information processing device 10 and the external power supply device 200 of the present embodiment control the transfer of electric power between the power grid PG of the traveling battery 30 and the traveling battery 30 such that the deterioration of the traveling battery 30 is curbed on the basis of the charging electric power or the discharging electric power of the traveling battery 30.

[Configuration of Information Processing Device 10]

Figure 2:
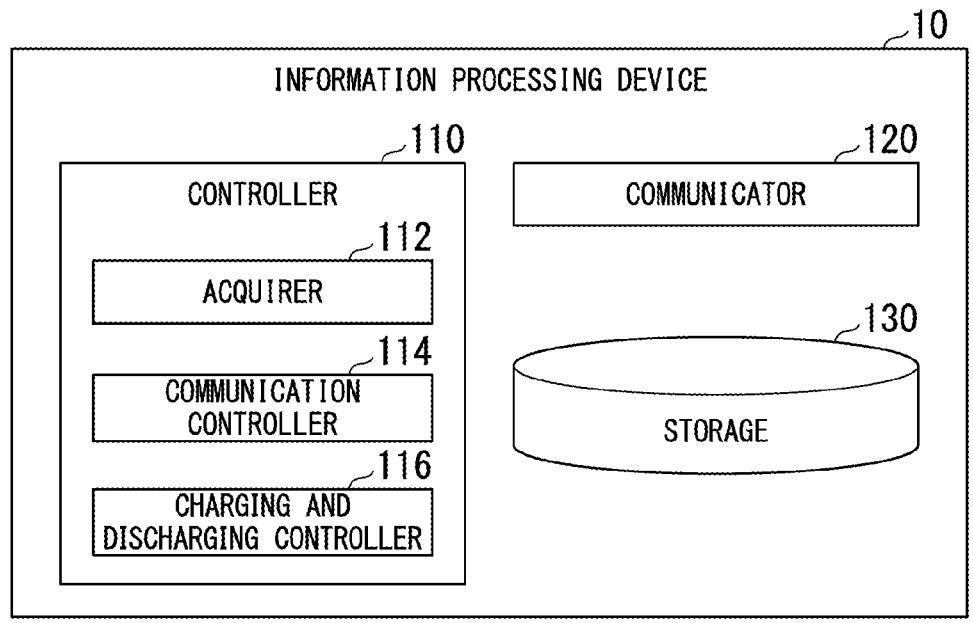
FIG. 2 is a diagram which shows an example of a configuration of an information processing device.

FIG. 2 is a diagram which shows an example of a configuration of the information processing device 10. The information processing device 10 includes, for example, a controller 110, a communicator 120, and a storage 130. The information processing device 10 may be realized as, for example, part of a function of an electronic controller (ECU) of the vehicle M that controls an internal combustion engine, an electric motor, and a transmission.

The controller 110 includes, for example, an acquirer 112, a communication controller 114, and a charging and discharging controller 116. These components are realized by, for example, a processor such as a central processing unit (CPU) executing a program (software) stored in the storage 130. Some or all of these components may be realized by hardware (circuit unit; including circuitry) such as large scale integration (LSI), an application specific integrated circuit (ASIC), a field-programmable gate array (FPGA), and a graphics processing unit (GPU), and may also be realized by cooperation of software and hardware.

The storage 130 may be realized by a storage device (a storage device including a non-transitory storage medium) such as a hard disk drive (HDD) or a flash memory, may be realized by a detachable storage medium (a non-transitory storage medium) such as a DVD or a CD-ROM, and may be realized by a storage medium mounted on a drive device.

The communicator 120 wirelessly communicates with, for example, various devices connected to the network NW. The controller 110 communicates with the external power supply device 200-1 connected by the cable CB via a communication line included in the cable CB.

The acquirer 112 acquires a detection result from a detector (not shown) that detects a value in accordance with a state of the traveling battery 30 (that is, whether the battery is being charged or discharged) among a (instantaneous) value of electric power (hereinafter, charging electric power) with which the traveling battery 30 is charged and a (instantaneous) value of electric power (hereinafter, discharging electric power) discharged from the traveling battery 30. The acquirer 112 acquires a detection result from a detector (not shown) that detects a state of charge (SOC) of the traveling battery 30. Hereinafter, the detection result indicating a value of the charging electric power or a value of the discharging electric power is referred to as a first detection result, and the detection result indicating the SOC is referred to as a second detection result. The acquirer 112 acquires information (hereinafter, instruction information) indicating an instruction regarding the charging and discharging of the traveling battery 30, received from the external power supply device 200-1 by the communicator 120. The SOC of the traveling battery 30 is an example of a "charging state of a secondary battery."

The communication controller 114 transmits information indicating the first detection result and the second detection result acquired by the acquirer 112 to the external power supply device 200-1 using the communicator 120. The acquirer 112 acquires, for example, the first detection result and the second detection result at predetermined time intervals, and the communication controller 114 transmits the information indicating the first detection result and the second detection result to the external power supply device 200 using the communicator 120 each time the information is acquired by the acquirer 112.

The charging and discharging controller 116 controls the charging and discharging of the traveling battery 30 on the basis of the instruction information acquired by the acquirer 112. The charging and discharging controller 116 causes the charging and discharging of the traveling battery 30 to stop, for example, when the instruction information indicates to stop the transfer of electric power between the power grid PG and the traveling battery 30. The charging and discharging controller 116 may cause the traveling battery 30 to be charged and discharged when the charging and discharging is not related to the transfer of the electric power between the power grid PG and the traveling battery 30 (for example, a case of charging and discharging in accordance with an electric power usage status of in-vehicle devices of the vehicle M).

[Configuration of External Power Supply Device 200]

Figure 3:
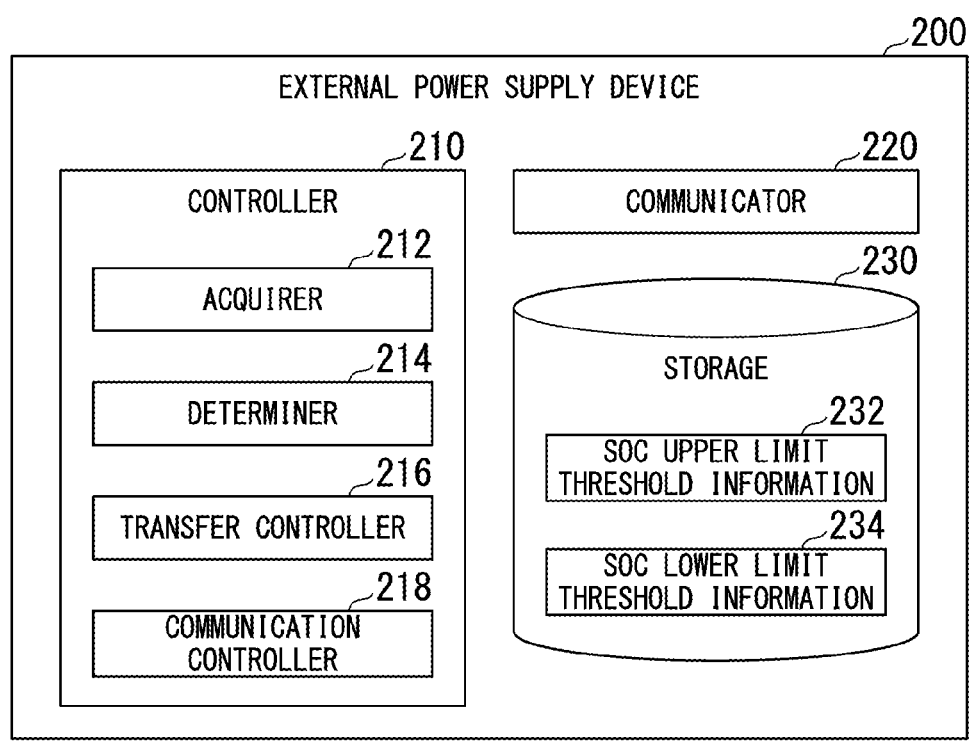
FIG. 3 is a diagram which shows an example of a configuration of an external power supply device.

FIG. 3 is a diagram which shows an example of a configuration of the external power supply device 200. The external power supply device 200 includes, for example, a controller 210, a communicator 220, and a storage 230. The external power supply device 200 is an example of a "charging device that is connected to the vehicle M via the cable CB and mediates the transfer of electric power between the power grid PG and the traveling battery 30," and a functional unit of the external power supply device 200 is an example of a "control system embedded in the charging device."

The controller 210 includes, for example, an acquirer 212, a determiner 214, transfer controller 216, and a communication controller 218. These components are realized by, for example, a processor such as a CPU executing a program (software) stored in the storage 230. Some or all of these components may be realized by hardware (including a circuit unit) such as an LSI, an ASIC, an FPGA, or a GPU, or may be realized by cooperation of software and hardware.

The storage 230 may be realized by a storage device (a storage device including a non-transitory storage medium) such as an HDD or a flash memory, may be realized by a detachable storage medium (a non-transitory storage medium) such as a DVD or a CD-ROM, and may also be realized by a storage medium attached to a drive device. Some or all of the storages 230 may be an external device that can be accessed by the external power supply device 200, such as a NAS or an external storage server. The storage 230 stores, for example, information such as SOC upper limit threshold information 232 and SOC lower limit threshold information 234 in addition to a program. The SOC upper limit threshold information 232 is information indicating an upper limit value of an SOC range (hereinafter, an SOC upper limit threshold THsU) that the traveling battery 30 preferably keeps. The SOC lower limit threshold information 234 is information indicating a lower limit value (hereinafter, an SOC lower limit threshold THsL) of the SOC range that the traveling battery 30 preferably keeps. The SOC upper limit threshold THsU and the SOC lower limit threshold THsL may be determined in advance on the basis of a rated capacity of the traveling battery 30 and may be updated according to a degree of the deterioration of the traveling battery 30.

The acquirer 212 acquires information indicating the first detection result and information indicating the second detection result, received from the information processing device 10 by the communicator 220.

The determiner 214 determines whether the SOC satisfies (condition 1) or (condition 2) on the basis of, for example, the second detection result acquired by the acquirer 212. (Condition 1) is to reach the SOC upper limit threshold THsU. (Condition 2) is to reach the SOC lower limit threshold THsL. The determiner 214 determines whether (condition 3) is satisfied on the basis of the first detection result acquired by the acquirer 212. (Condition 3) is that a state in which the charging electric power and the discharging electric power are equal to or less than a threshold continues for a first predetermined time. This threshold is, for example, a value indicating approximately 0 [kW], and the state in which the charging electric power and the discharging electric power are equal to or less than the threshold is, for example, a state in which the traveling battery 30 is not charged or discharged. The first predetermined time is, for example, a short time in which the deterioration of the traveling battery 30 does not progress even if the traveling battery 30 is in a standby state without being charged or discharged.

The transfer controller 216 generates the instruction information on the basis of a determination result of the determiner 214 and causes the communicator 220 to transmit it to the information processing device 10. For example, when the determiner 214 determines that at least one of (condition 1) to (condition 3) is satisfied, the transfer controller 216 generates instruction information that indicates to stop the transfer of electric power between the power grid PG and the traveling battery 30.

After the transfer of electric power between the power grid PG and the traveling battery 30 is stopped, when the SOC indicated by the first detection result at a timing of the stopping has reached the SOC upper limit threshold THsU (that is, in a case of stopping due to satisfaction of (condition 1)), the transfer controller 216 generates instruction information that indicates to stop the transfer of electric power between the power grid PG and traveling battery 30 until (condition 4) is satisfied. (Condition 4) is that a second predetermined time has elapsed, or that the SOC has reached the SOC lower limit threshold THsL. The second predetermined time is, for example, an amount of time that has no effect on (or has little effect on) the deterioration of the traveling battery 30 even if the charging and discharging of the traveling battery 30 are repeated due to the transfer of electric power between the power grid PG and the traveling battery 30.

[Scenario in Which (condition 1) and (condition 4) are Satisfied]

Figure 4:
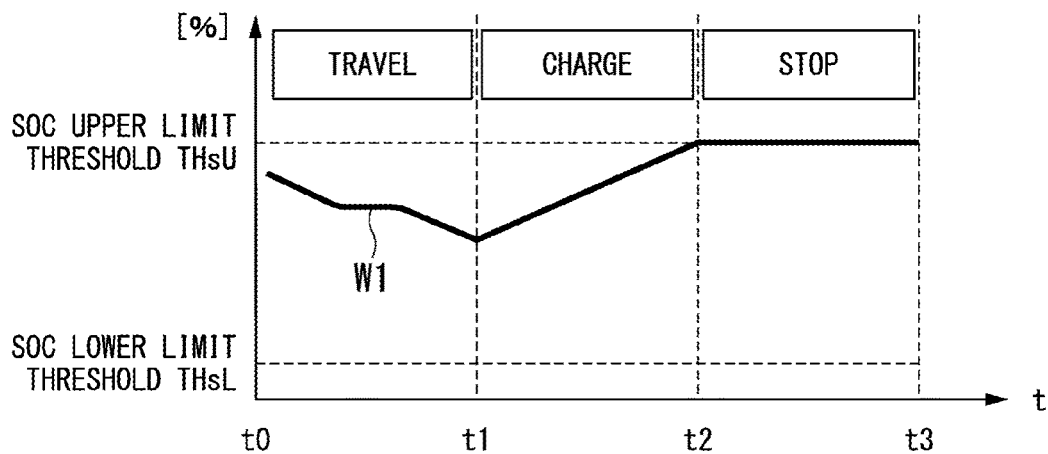
FIG. 4 is a graph which shows changes over time in an SOC in a scenario in which (condition 1) and (condition 4) are satisfied.

In the following description, a scenario in which each condition is satisfied will be described with reference to the drawings. FIG. 4 is a graph which shows changes over time in the SOC in a scenario in which (condition 1) and (condition 4) are satisfied. In FIG. 4, a vertical axis represents the SOC of the traveling battery 30, and a horizontal axis represents time. A waveform W1 in FIG. 4 is a waveform which indicates the changes over time in the SOC of the traveling battery 30.

In the scenario shown in FIG. 4, the vehicle M travels between times t0 and t1, and the electric power stored in the traveling battery 30 is used for traveling of the vehicle M. For this reason, as indicated by the waveform W1, the SOC of the traveling battery 30 decreases between the times t0 and t1.

In the scenario shown in FIG. 4, the vehicle stops at the time t1 and is connected to the external power supply device 200 via the cable CB. As the traveling battery 30 is connected to the external power supply device 200, charging is started under control of the charging and discharging controller 116. For this reason, as indicated by the waveform W1, the SOC of the traveling battery 30 rises between times t1 and t2, and reaches the SOC upper limit threshold THsU at the time t2. The determiner 214 determines that (condition 1) is satisfied at the time t2. The transfer controller 216 generates instruction information that indicates to stop the transfer of electric power between the power grid PG and the traveling battery 30 on the basis of the determination result of the determiner 214. The communication controller 218 transmits the instruction information generated by the transfer controller 216 to the information processing device 10 using the communicator 220. The acquirer 112 of the information processing device 10 receives the instruction information transmitted from the external power supply device 200 by the communicator 120. The charging and discharging controller 116 causes the charging and discharging of the traveling battery 30 to stop on the basis of the acquired instruction information (that is, the traveling battery 30 is put into a sleep state). Therefore, as indicated by the waveform W1, the SOC value at the time t2 is held after the time t2.

When the charging and discharging of the traveling battery 30 are stopped as (condition 1) is satisfied, the determiner 214 generates instruction information that instructs to stop the transfer of electric power between the power grid PG and the traveling battery 30 until (condition 4) is satisfied. Therefore, the charging and discharging controller 116 does not perform (stops) the transfer of electric power even if a state in which the transfer of the electric power between the power grid PG and the traveling battery 30 is stopped has lasted a second predetermined time, or there is a request for the transfer of electric power between the power grid PG and the traveling battery 30 before the SOC decreases due to internal consumption of electric power of the traveling battery 30 by the vehicle-mounted devices of the vehicle M and the SOC reaches the SOC lower limit threshold THsL.

Here, if the traveling battery 30 is turned on for charging even though it cannot be charged, the number of times the traveling battery 30 is started may increase unnecessarily and deterioration may progress. If the traveling battery 30 is turned on even if it is not fully charged (for example, the SOC is slightly decreased) after the transfer of electric power is stopped in a state in which it cannot be charged, the number of times the traveling battery 30 is started may increase unnecessarily and deterioration may progress in some cases. The information processing device 10 and the external power supply device 200 prevent the traveling battery 30 from being turned on when the traveling battery 30 cannot be charged or is not fully charged, and thereby it is possible to prevent the number of times the traveling battery 30 is started from increasing.

[Scenario in Which (condition 2) is Satisfied]

Figure 5:
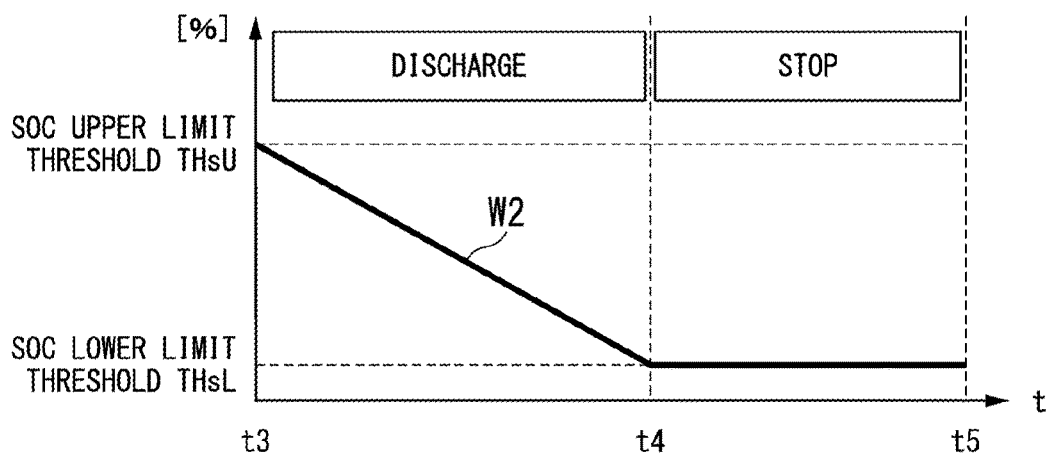
FIG. 5 is a graph which shows changes over time in the SOC in a scenario in which (condition 2) is satisfied.

FIG. 5 is a graph which shows changes in the SOC over time in a scenario in which (condition 2) is satisfied. In FIG. 5, a vertical axis represents the SOC of the traveling battery 30, and a horizontal axis represents time. A waveform W2 in FIG. 5 is a waveform that shows changes in the SOC of the traveling battery 30 over time.

In the scenario shown in FIG. 5, the traveling battery 30 is connected to the power grid PG on the basis of an instruction of the aggregate device 500, and supplies (discharges) insufficient electric power to the power grid PG. For this reason, as indicated by the waveform W2, the SOC of the traveling battery 30 decreases between times t3 and t4, and reaches the SOC lower limit threshold THsL at the time t4. The determiner 214 determines that (condition 2) is satisfied at the time t4. Thereafter, since processing in which the transfer controller 216 generates instruction information that indicates to stop the transfer of electric power between the power grid PG and the traveling battery 30, and the charging and discharging controller 116 causes the charging and discharging of the traveling battery 30 to stop is the same as the processing in the case of (condition 1) described above, description thereof will be omitted. As (condition 2) is satisfied, the charging and discharging controller 116 causes the transfer of electric power between the power grid PG and the traveling battery 30 to stop for a third predetermined time. The third predetermined time may be the same as or may be different from the second predetermined time.

Here, if the traveling battery 30 is turned on for discharging even though it cannot be discharged, the number of times the traveling battery 30 is started may unnecessarily increase and deterioration may progress. According to the information processing device 10 and the external power supply device 200, when the traveling battery cannot be discharged, the traveling battery 30 is not turned on, and thereby it is possible to prevent the number of times the traveling battery 30 is started from increasing.

[Scenario in Which (condition 3) is Satisfied]

Figure 6:
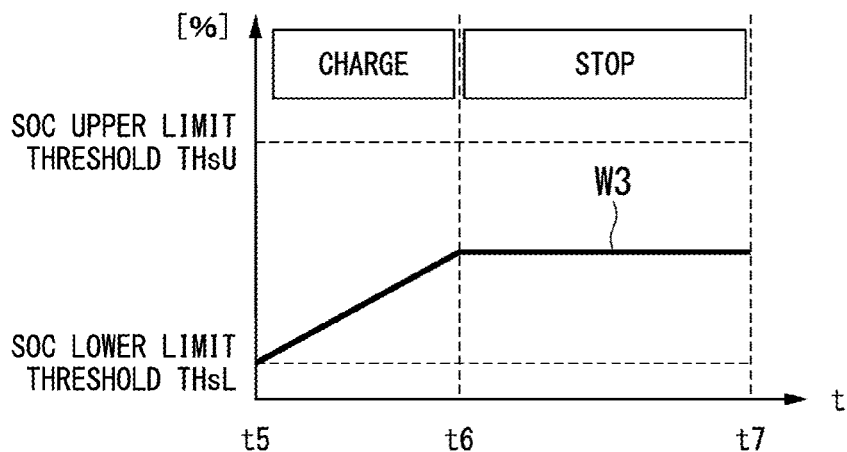
FIG. 6 is a graph which shows changes over time in the SOC in a scenario in which (condition 3) is satisfied.

FIG. 6 is a graph which shows changes in the SOC over time in a scenario in which (condition 3) is satisfied. In FIG. 6, a vertical axis represents the SOC of the traveling battery 30, and a horizontal axis represents time. A waveform W3 in FIG. 5 is a waveform which indicates the changes in the SOC of the traveling battery 30 over time.

In the scenario shown in FIG. 6, the traveling battery 30 is connected to the power grid PG on the basis of the instruction of the aggregate device 500 and consumes (is charged with) surplus electric power in the power grid PG. For this reason, as indicated by the waveform W3, the SOC of the traveling battery 30 rises between times t5 and t6 and keeps a constant value at the time t6. The SOC is a constant value at the time t6, for example, because the surplus electric power in the power grid PG is fully consumed by the traveling battery 30 or other devices participating in the V2X system 1, and the traveling battery 30 does not need to consume (be charged with) electric power. The determiner 214 determines that (condition 3) is satisfied at the time t6. Thereafter, since processing in which the transfer controller 216 generates instruction information which indicates to stop the transfer of electric power between the power grid PG and the traveling battery 30, and the charging and discharging controller 116 causes the charging and discharging of the traveling battery 30 to stop is the same as the processing in the case of (condition 1) described above, description thereof will be omitted. As (condition 3) is satisfied, the charging and discharging controller 116 causes the transfer of electric power between the power grid PG and the traveling battery 30 to stop for a fourth predetermined time. The fourth predetermined time may be the same as or may be different from the second predetermined time or the third predetermined time.

Here, if the traveling battery 30 is kept in an on state even though the transfer of electric power (that is, charging and discharging) between the power grid PG and the traveling battery 30 is not performed, deterioration may progress in some cases. According to the information processing device 10 and the external power supply device 200, it is possible to prevent the traveling battery 30 from being unnecessarily kept in the on state and to prevent deterioration from progressing.

[Scenario in Which (condition 5) is Satisfied]

As (condition 1) to (condition 3) are satisfied, when the determiner 214 determines that (condition 5) is satisfied after the transfer of electric power between the power grid PG and the traveling battery 30 is stopped for the second predetermined time, the third predetermined time, or the fourth predetermined time, or until the SOC lower limit threshold THsL is reached, the transfer controller 216 may generate instruction information that indicates to stop an operation of the information processing device 10. (Condition 5) is that the transfer of electric power between the power grid PG and the traveling battery 30 is not performed for a fifth predetermined time. The fifth predetermined time may be the same as or may be different from the second predetermined time, the third predetermined time, or the fourth predetermined time.

Figure 7:
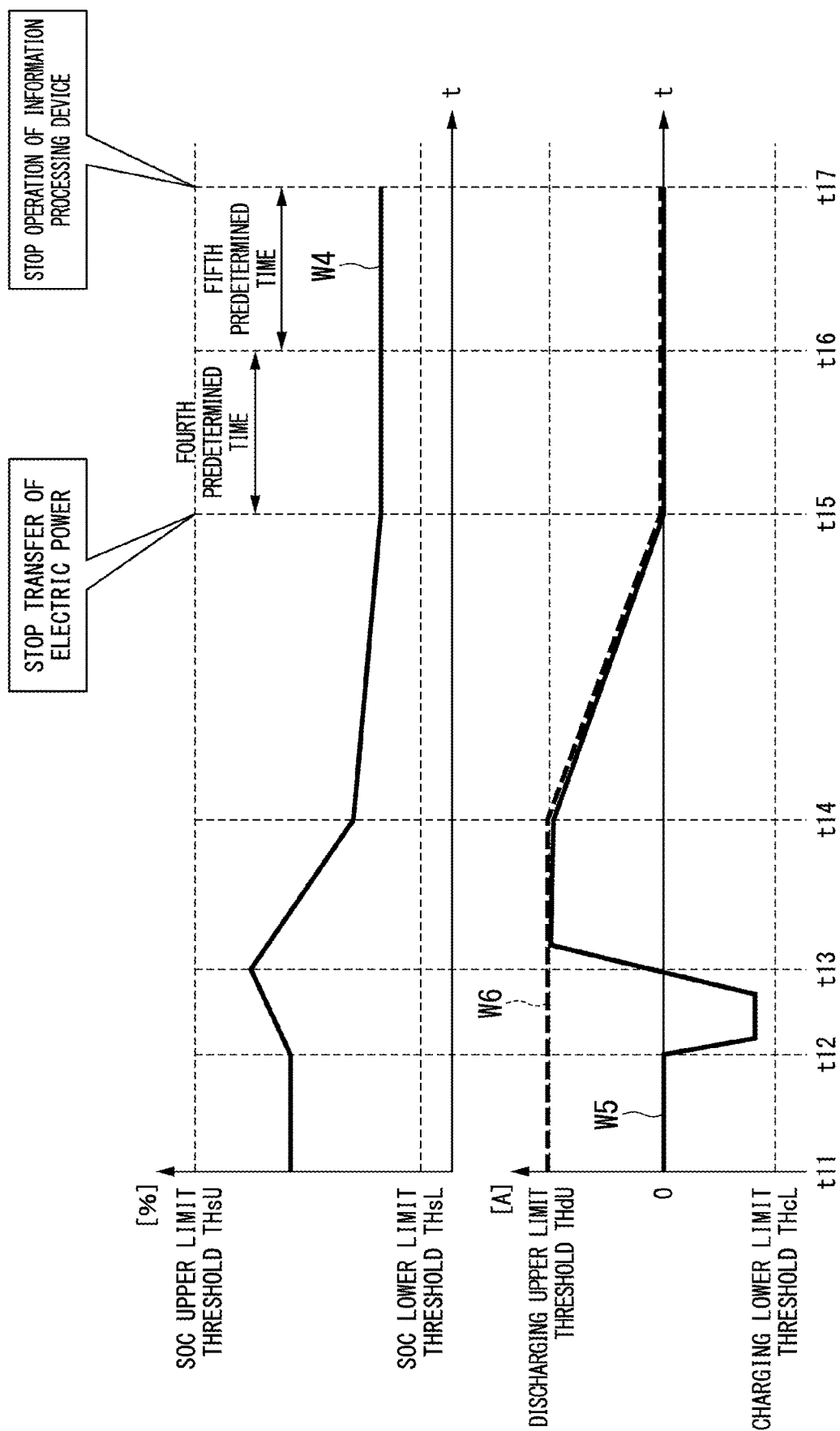
FIG. 7 is a graph which shows changes over time in the SOC and a charging and discharging current in a scenario in which (condition 5) is satisfied.

FIG. 7 is a graph which shows changes in the SOC and the charging and discharging current over time in a scenario in which (condition 5) is satisfied. In FIG. 7, a vertical axis of an upper diagram indicates the SOC of the traveling battery 30, and a vertical axis of a lower diagram indicates a discharging current and a charging current of the traveling battery 30 due to the charging and discharging of the traveling battery 30. In the following description, it is assumed that the discharging current flowing from the traveling battery 30 to the power grid PG or an indoor power distribution system via the external power supply device 200 due to discharging is indicated as a positive value, and the charging current flowing from the power grid PG or the indoor power distribution system to the traveling battery 30 via the external power supply device 200 due to charging is indicated as a negative value. In FIG. 7, a horizontal axis represents time. A waveform W4 in FIG. 7 is a waveform which indicates changes in the SOC of the traveling battery 30 over time, and a waveform W5 is a waveform which indicates changes in the discharging current and charging current of traveling battery 30 over time. A waveform W6 is a waveform which indicates a limit value of the discharging current of the traveling battery 30.

As indicated by the waveforms W4 and W5, the traveling battery 30 is charged from a time t12 to a time t13. As indicated by the waveforms W4 and W5, the traveling battery 30 is discharged from the time t13 to a time t15. The charging and discharging controller 116 controls the discharging of the traveling battery 30 such that the discharging current of the traveling battery 30 does not exceed the waveform W6.

Although not shown in FIG. 7, the traveling battery 30 has a determined limit value of the charging current, and the charging and discharging controller 116 controls the charging of the traveling battery 30 such that the charging current of the traveling battery 30 does not exceed the limit value.

As indicated by the waveforms W4 and W5, the charging and discharging of the traveling battery 30 is not performed at the time t15. Therefore, the determiner 214 determines that (condition 3) is satisfied at the time t15. Thereafter, processing in which the transfer controller 216 generates instruction information that indicates to stop the transfer of electric power between the power grid PG and the traveling battery 30, and the charging and discharging controller 116 causes the charging and discharging of the traveling battery 30 to stop is the same as the processing of (condition 1) to (condition 3) described above, and thus description thereof will be omitted.

Here, the charging and discharging controller 116 causes the transfer of electric power between the power grid PG and the traveling battery 30 to stop for the fourth predetermined time as (condition 3) is satisfied on the basis of the instruction information obtained from the external power supply device 200. Then, the transfer controller 216 determines whether (condition 5) is satisfied after the transfer of electric power between the power grid PG and the traveling battery 30 is stopped for the second predetermined time, the third predetermined time, the fourth predetermined time, or until the SOC lower limit threshold THsL is reached (in this example, after the fourth predetermined time period has elapsed (that is, at a time t16)) as (condition 1) to (condition 3) are satisfied. As indicated by the waveforms W4 and W5, the transfer of electric power between the power grid PG and the traveling battery 30 is not performed from the time t16 to a time t17 at which the fifth predetermined time has elapsed. Therefore, the transfer controller 216 determines that (condition 5) is satisfied and generates instruction information that indicates to stop the operation of the information processing device 10. When the communicator 120 receives the instruction information to stop the operation of the information processing device 10, the controller 110 causes the operation of the information processing device 10 to stop (that is, the charging and discharging of the traveling battery 30 is also stopped). The information processing device 10 may stop the operation of another ECU mounted in the vehicle M instead of or in addition to the information processing device 10. As a result, the external power supply device 200 can keep the information processing device 10 from being unnecessarily put into the standby state and limit the progress of deterioration of the traveling battery 30 and other in-vehicle devices mounted in the vehicle M.

[Operation Flow]

Figure 8:
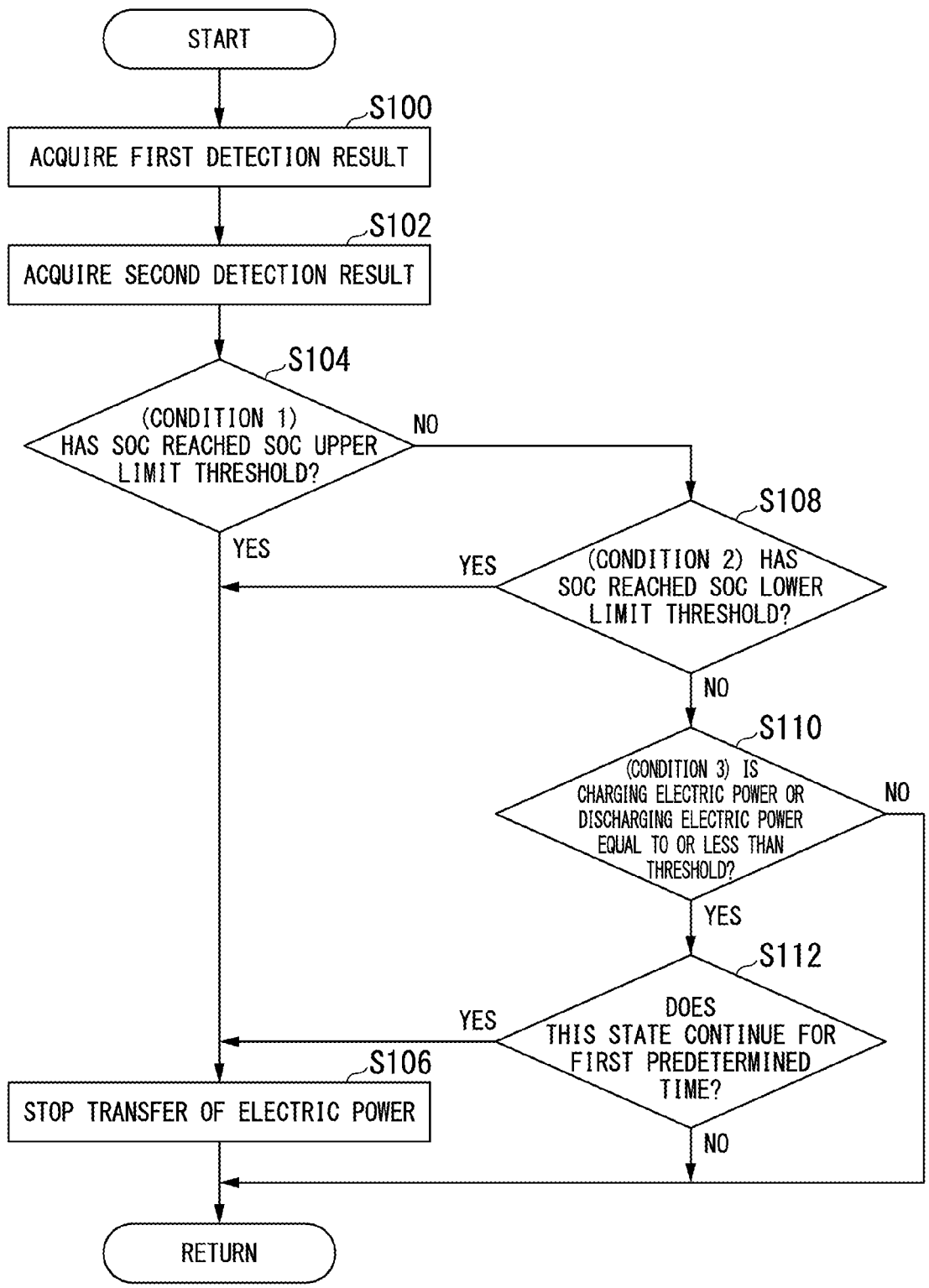
FIG. 8 is a flowchart which shows a series of flow of processing related to (condition 1) to (condition 3).

FIG. 8 is a flowchart which shows a flow of a series of processing related to (condition 1) to (condition 3). First, the acquirer 112 acquires the first detection result from a detector (not shown) that detects a value in accordance with the state of the traveling battery 30 (that is, whether it is being charged or discharged) among the value of the charging electric power and the value of the discharging electric power (step S100). Next, the acquirer 112 acquires the second detection result from a detector (not shown) that detects the state of charge (SOC) of the traveling battery 30 (step S102).

Next, the determiner 214 determines whether the SOC has reached the SOC upper limit threshold THsU (that is, whether (condition 1) is satisfied) on the basis of the second detection result among the first detection result and the second detection result acquired by the acquirer 212 from the acquirer 112 via the communicator 220 (step S104). When the determiner 214 determines that (condition 1) is satisfied, the transfer controller 216 generates instruction information that indicates to stop the transfer of electric power between the power grid PG and the traveling battery 30, and the charging and discharging controller 116 causes the traveling battery 30 to stop on the basis of the instruction information and causes the transfer of electric power between the power grid PG and the traveling battery 30 to stop (step S106).

When the determiner 214 determines that the SOC indicated in the second detection result does not satisfy (condition 1), it determines whether the SOC has reached the SOC lower limit threshold THsL (that is, whether (condition 2) is satisfied) on the basis of the second detection result (step S108). When the determiner 214 determines that (condition 2) is satisfied, the transfer controller 216 proceeds with the processing to step S106.

When the determiner 214 determines that the SOC indicated in the second detection result does not satisfy (condition 2), it determines whether the charging electric power and the discharging electric power are equal to or less than a threshold (that is, whether part of (condition 3) is satisfied) on the basis of the first detection result (step S110). When the determiner 214 determines that the part of (condition 3) is satisfied, it determines whether the state in which the charging electric power and the discharging electric power are equal to or less than the threshold continues for the first predetermined time (that is, whether (condition 3) is satisfied) (step S112). When the determiner 214 determines that (condition 3) is satisfied, the transfer controller 216 proceeds with the processing to step S106. When the determiner 214 determines that the part of (condition 3) or all of (condition 3) is not satisfied, the determiner 214 regards that the charging and discharging controller 116 is not in a state of causing the traveling battery 30 to stop and causing the transfer of electric power between the power grid PG and the traveling battery 30 to stop, and ends the processing.

[Operation Flow]

Figure 9:
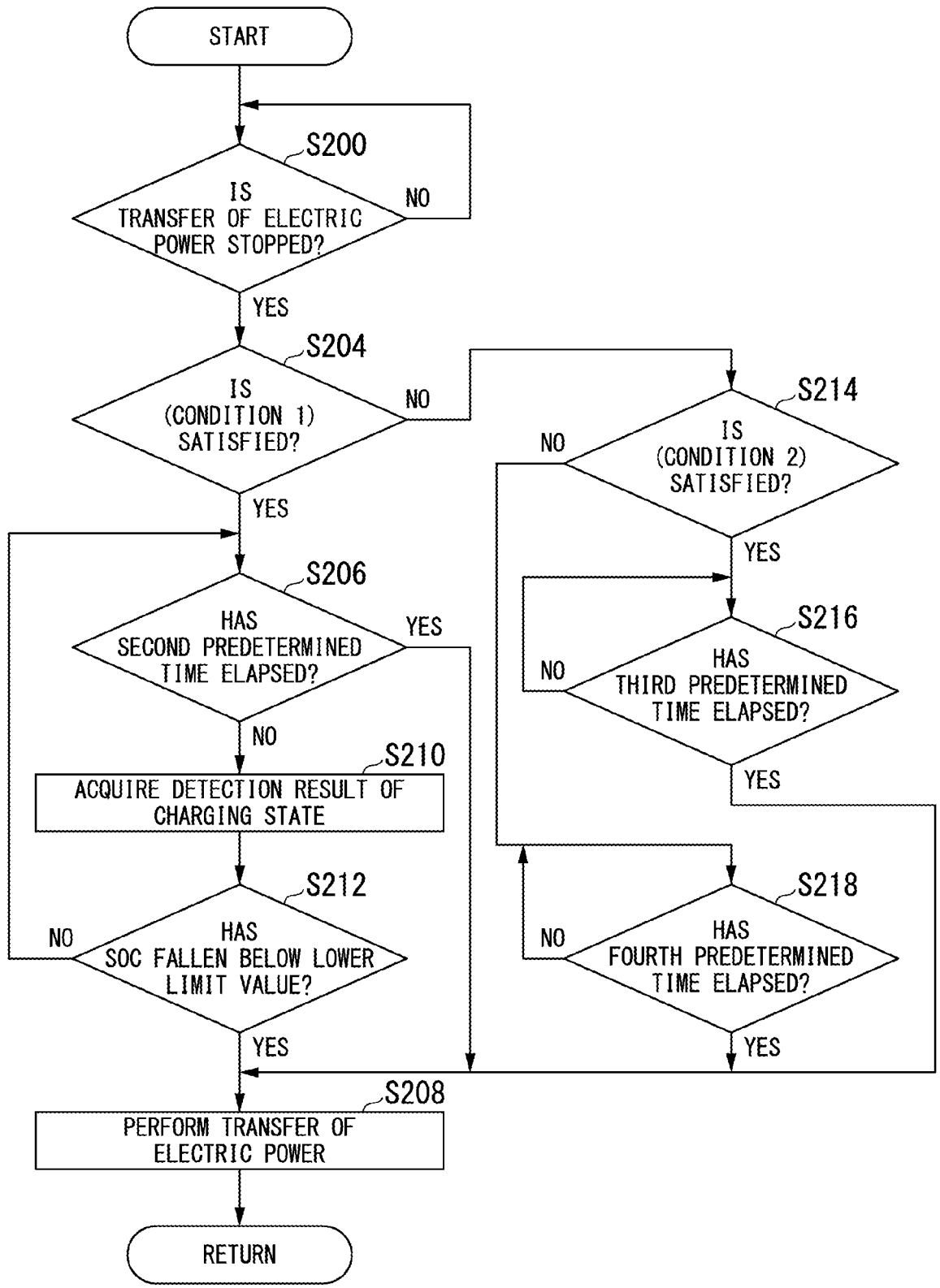
FIG. 9 is a flowchart which shows a series of flow of a series of processing related to (condition 4) after (condition 2) and (condition 3) are satisfied.

FIG. 9 is a flow chart which shows a flow of a series of processing related to (condition 4) after (condition 2) to (condition 3) are satisfied. First, the transfer controller 216 determines whether the transfer of electric power between the power grid PG and the traveling battery 30 has been stopped on the basis of the instruction information (step S200). When the stop processing is processing related to the satisfaction of (condition 1) (step S204), the transfer controller 216 determines whether the second predetermined time has elapsed since the stop processing was performed (step S206). When it is determined that the second predetermined time has elapsed since the stop processing was performed, the transfer controller 216 may generate instruction information indicating that the transfer of electric power between the power grid PG and the traveling battery 30 may be performed by the traveling battery 30, and the charging and discharging controller 116 causes the traveling battery 30 to operate on the basis of the instruction information to perform the transfer of electric power between the power grid PG and the traveling battery 30 (step S208).

The acquirer 212 acquires the second detection result from the acquirer 112 via the communicator 220 when it is determined that the second predetermined time has not elapsed since the stop processing was performed by the transfer controller 216. (Step S210). The transfer controller 216 determines whether the SOC has fallen below the SOC lower limit threshold THsL on the basis of the second detection result acquired by the acquirer 212 (step S212). When the transfer controller 216 determines that the SOC has fallen below the SOC lower limit threshold THsL, the transfer controller 216 proceeds with the processing to step S208 and causes the traveling battery 30 to operate to perform the transfer of electric power between the power grid PG and the traveling battery 30. The transfer controller 216 repeats the processing of step S206 and steps S210 to S212 until the second predetermined time elapses after the stop processing is performed or until the SOC falls below the SOC lower limit threshold THsL.

When the stop processing is not the processing related to the satisfaction of (condition 1), the transfer controller 216 determines whether the stop processing is processing related to the satisfaction of (condition 2) (step S214). When the stop processing is processing related to the satisfaction of (condition 2), the transfer controller 216 determines whether the third predetermined time has elapsed since the stop processing was performed (step S216). When the transfer controller 216 determines that the third predetermined time has elapsed since the stop processing was performed, the transfer controller 216 proceeds with the processing to step S208 and causes the traveling battery 30 to operate to perform the transfer of electric power between the power grid PG and the traveling battery 30. The transfer controller 216 waits until the third predetermined time elapses after the stop processing is performed.

When the stop processing is not processing related to satisfying the (condition 1) and (condition 2), the transfer controller 216 regards it as processing related to satisfying the (condition 3), and determines whether the fourth predetermined time has elapsed since the stop processing was performed (step S218). When the transfer controller 216 determines that the fourth predetermined time has elapsed since the stop processing was performed, the transfer controller 216 proceeds with the processing to step S208, causes the traveling battery 30 to operate, and causes the transfer of electric power between the power grid PG and the traveling battery 30 to be performed. The transfer controller 216 waits until the fourth predetermined time elapses after the stop processing is performed.

[Summary of Embodiment]

As described above, according to the information processing device 10 and the external power supply device 200 of the present embodiment, when a condition in which it is not preferable to perform the charging and discharging of the traveling battery 30 or a condition in which it is not preferable to turn on the traveling battery 30 is satisfied, the transfer of electric power between the traveling battery 30 and the power grid PG by the traveling battery 30 can be stopped to curb the deterioration of the traveling battery.

[Information Processing Device 10, External Power Supply Device 200, and Other Configuration Example]

Although the case in which the controller 210 of the external power supply device 200 includes the determiner 214 and the transfer controller 216 has been described above, the present invention is not limited thereto. The determiner 214 and the transfer controller 216 may be included in the controller 110 of the information processing device 10. In this case, the information processing device 10 itself performs a control on the transfer of electric power between the power grid PG and the traveling battery 30 performed by the traveling battery 30. In this case, the information processing device 10 is an example of a "control device which is mounted in the vehicle M and controls the charging and discharging of electric power of the traveling battery 30," and a functional unit of the information processing device 10 is an example of a "control system embedded in the control device." One of the determiner 214 and the transfer controller 216 may be provided in the external power supply device 200, and the other may be provided in the information processing device 10.

[Instruction on Action Related to V2X System 1]

Although the case in which the aggregate device 500 instructs the external power supply device 200 and the vehicle M to perform the action related to the V2X system 1 has been described above, the present invention is not limited thereto. The aggregate device 500 may determine an action which the external power supply device 200 or the vehicle M is required to perform, and provides a result of the determination to an external device. In this case, the external device instructs the external power supply device 200 and the vehicle M to perform the action. This external device may be, for example, a server device included in an electricity business company (including a power transmission and distribution business company and a retail electricity business company).

In the above, modes for implementing the present invention have been described using the embodiments, but the present invention is not limited to such embodiments, and various modifications and substitutions can be added within a range not departing from the gist of the present invention.

What is claimed is:

1. A control system that controls transfer of electric power between a power grid and a secondary battery that is mounted in a vehicle and stores electric power for travel, comprising:
    a determiner configured to determine whether a state in which first electric power or second electric power is equal to or less than a threshold continues for a predetermined time on the basis of a detection result of the first electric power or the second electric power, wherein the first electric power is a first amount of electric power that is transferred from the power grid to the secondary battery per unit of time when the power grid provides the secondary battery with the electric power, and wherein the second electric power is a second amount of electric power that is transferred from the secondary battery to the power grid per unit of time when the secondary battery provides the power grid with the electric power; and
    a controller configured to cause the transfer of electric power between the power grid and the secondary battery to stop when the determiner determines that the state in which the first electric power or the second electric power is equal to or less than the threshold continues for the predetermined time.

2. The control system according to claim 1,
    wherein the determiner and the controller are connected to the vehicle by a cable and are embedded in a charging device that mediates the transfer of electric power between the power grid and the secondary battery.

3. The control system according to claim 1,
    wherein the determiner and the controller are mounted in the vehicle and are embedded in a control device that controls charging and discharging of electric power of the secondary battery.

4. The control system according to claim 1,
    wherein the determiner determines whether a detection result of a charging state of the secondary battery at a timing at which the transfer of electric power is stopped has reached an upper limit value of the charging state or a lower limit value of the charging state, and
    the controller stops the transfer of electric power between the power grid and the secondary battery when the determiner determines that the detection result has reached the upper limit value of the charging state or the lower limit value of the charging state and even when a request for charging and discharging of the secondary battery is received from an external device.

5. The control system according to claim 1,
    wherein, when a detection result of the charging state of the secondary battery at the timing at which the transfer of electric power is stopped has reached an upper limit value of the charging state, the controller stops the transfer of electric power between the power grid and the secondary battery for a predetermined time or until the detection result falls below a lower limit value of the charging state.

6. A control method comprising:
    by a computer that controls transfer of electric power between a power grid and a secondary battery that is mounted in a vehicle and stores electric power for travel,
    determining whether a state in which first electric power or second electric power is equal to or less than a threshold continues for a predetermined time on the basis of a detection result of the first electric power or the second electric power, wherein the first electric power is a first amount of electric power that is transferred from the power grid to the secondary battery per unit of time when the power grid provides the secondary battery with the electric power, and wherein the second electric power is a second amount of electric power that is transferred from the secondary battery to the power grid per unit of time when the secondary battery provides the power grid with the electric power; and
    causing the transfer of electric power between the power grid and the secondary battery to stop when the state in which the first electric power or the second electric power is equal to or less than the threshold continues for the predetermined time.

7. A non-transitory computer-readable storage medium that stores a computer program to be executed by a computer that controls transfer of electric power between a power grid and a secondary battery that is mounted in a vehicle and stores electric power for travel, to perform at least:
    determining whether a state in which first electric power or second electric power is equal to or less than a threshold continues for a predetermined time on the basis of a detection result of the first electric power or the second electric power, wherein the first electric power is a first amount of electric power that is transferred from the power grid to the secondary battery per unit of time when the power grid provides the secondary battery with the electric power and wherein the second electric power is a second amount of electric power that is transferred from the secondary battery to the power grid per unit of time when the secondary battery provides the power grid with the electric power; and
    causing the transfer of electric power between the power grid and the secondary battery to stop when the state in which the first electric power or the second electric power is equal to or less than the threshold continues for the predetermined time.

8. The control system according to claim 1,
    wherein the first electric power is a first instantaneous value of electric power with which the power grid provides the secondary battery, and
    the second electric power is a second instantaneous value of electric power with which the secondary battery provides the power grid.

9. The control system according to claim 1,
    wherein the determiner is configured to determine whether an SOC (State of Charge) of the secondary battery reaches an upper limit threshold,
    the controller is configured to cause the charging of the secondary battery to stop when the charging of the secondary battery is executing and the SOC of the secondary battery reaches the upper limit threshold, and
    the controller is configured to cause the transfer of electric power between the power grid and the secondary battery to stop when the determiner determines that the state in which the first electric power or the second electric power is equal to or less than the threshold continues for the predetermined time in a case in which the transfer of electric power between the power grid and the secondary battery continues.

10. The control system according to claim 9,
wherein the first electric power is a first instantaneous value of electric power with which the power grid provides the secondary battery,
the second electric power is a second instantaneous value of electric power with which the secondary battery provides the power grid.

11. The control system according to claim 1,
wherein the determiner is configured to determine whether an SOC (State of Charge) of the secondary battery reaches an upper limit threshold and to determine whether the SOC of the secondary battery reaches a lower limit threshold,
the controller is configured to cause the charging of the secondary battery to stop when the charging of the secondary battery is executing and the SOC of the secondary battery reaches the upper limit threshold,
the controller is configured to cause the discharging of the secondary battery to stop when the discharging of the secondary battery is executing and the SOC of the secondary battery reaches the lower limit threshold, and
the controller is configured to cause the transfer of electric power between the power grid and the secondary battery to stop when the determiner determines that the state in which the first electric power or the second electric power is equal to or less than the threshold continues for the predetermined time in a case in which the transfer of electric power between the power grid and the secondary battery continues.

12. The control system according to claim 11,
wherein the first electric power is a first instantaneous value of electric power with which the power grid provides the secondary battery,
the second electric power is a second instantaneous value of electric power with which the secondary battery provides the power grid.

* * * * *